United States Patent [19]
Shimasaki et al.

[11] Patent Number: 5,498,654
[45] Date of Patent: Mar. 12, 1996

[54] SLIDING BEARING MATERIAL

[75] Inventors: Keiichi Shimasaki; Hiroshi Ito; Yasushi Yamaguchi; Hiroaki Hayakawa, all of Aichi, Japan

[73] Assignee: Taiho Kogyo Co., Ltd., Toyota, Japan

[21] Appl. No.: 182,174

[22] PCT Filed: Jun. 4, 1993

[86] PCT No.: PCT/JP93/00754

§ 371 Date: Feb. 2, 1994

§ 102(e) Date: Feb. 2, 1994

[30] Foreign Application Priority Data

Jun. 5, 1992 [JP] Japan ..................................... 4-169968

[51] Int. Cl.$^6$ .............................. C08K 3/22; C08K 3/04; C08L 67/03; C08L 27/12
[52] U.S. Cl. .......................... 524/432; 524/495; 524/496; 524/513; 524/546; 525/165; 252/511
[58] Field of Search .................................. 524/432, 495, 524/496, 546, 513; 525/165; 252/511

[56] References Cited

U.S. PATENT DOCUMENTS

| 5,124,397 | 1/1992 | Kanazawa et al. | 524/495 |
| 5,183,594 | 2/1993 | Yoshinaka et al. | 252/511 |
| 5,276,080 | 1/1994 | Oku | 524/432 |

FOREIGN PATENT DOCUMENTS

| 60-120798 | 6/1985 | Japan. | |
| 61-108651 | 5/1986 | Japan. | |
| 61-261396 | 11/1986 | Japan. | |
| 0020347 | 1/1991 | Japan | 524/495 |
| 3-223397 | 10/1991 | Japan. | |
| 0239756 | 10/1991 | Japan | 524/432 |
| 0098154 | 4/1993 | Japan | 524/495 |

*Primary Examiner*—Peter A. Szekely
*Attorney, Agent, or Firm*—Armstrong, Westerman, Hattori, McLeland & Naughton

[57] ABSTRACT

Sliding bearing material containing at least two of aromatic polyester-resin particles, spherical carbon particles, and zinc-oxide whisker dispersed in a matrix consisting of polytetrafluoroethylene. The PTFE-based material exhibits little wear under conditions in which vibration is imparted, thereby enhancing reliability of the sliding parts of various machines and equipment and preventing enlargement of clearances during operation.

7 Claims, 5 Drawing Sheets

SLIDING BEARING MATERIAL

TECHNICAL FIELD

The present invention is related to sliding bearing material, more particularly to the polytetrafluoroethylene-based sliding bearing material with improved resistance against fretting wear.

PRIOR ART

Polytetrafluoroethylene (hereinafter referred to as "PTFE") is used as the sliding bearing material of auxiliary machinery or the like of an automobile. Since the wear-resistance of PTFE is not exceptional, generally, metal or metal oxide is added to strengthen PTFE, lubricant such as $MoS_2$ or graphite is added to improve the frictional and wear properties, or additives to improve the sliding characteristics are added in the PTFE based sliding bearing material. These additives are uniformly dispersed in the matrix material consisting of PTFE. These sliding bearing materials are used as the solid material, or are used as baked and are bonded in the clearances of the layer of the bearing-alloy such as lead bronze sintered on the backing metal.

The additives are utilized in the above PTFE-based sliding bearing materials mentioned above with the following aim. That is, in the initial period of sliding, the PTFE wears out slightly on the sliding surface so that the additive concentration on the sliding surface increases. The wear-resistance effect of the additive is thus utilized and hence the wear is suppressed. When the sliding advances further, the additive concentration increases further, so that the wear at the sliding surface considerably decreases. Thus wear doesn't advance any further under a sliding condition.

Lead or lead-alloy, whose lubrication property or compatibility is excellent, is a suitable additive for PTFE which is used in a general dry sliding condition. However, lead from the PTFE sliding bearing with a lead- or lead-alloy additive occasionally coheres on the opposing material and incurs abnormal wear in the accompanying sliding and fretting. These cohesive additives wear out in such a manner that they are transferred from the sliding material to the opposing material and form a thick film on the latter material. The cohesion is therefore very likely to occur. In addition, these additives may roughen the surface of the opposed material.

PTFE-based sliding bearing material with the addition of lead or lead alloy and aromatic polyester particles is also known. It involves however a problem that wear due to cohesion is also likely to occur.

A sliding condition, under which cohesion is particularly likely to occur, is a minute vibration of a sliding bearing, which causes fretting wear. A specific case is vibration in a direction intersecting with the rotational, main sliding direction, and is realized in such a sliding bearing for a frequently vibrating rotary axis. Since the lead or lead alloy grows on the opposed surface, the sliding thus realized is the one between the cohesive materials of the same kind and hence cohesion is likely to occur.

DISCLOSURE OF THE INVENTION

It is therefore an object of the present invention to provide a PTFE based sliding bearing material having improved cohesive wear.

The present inventors considered the following points in developing the PTFE-based sliding material. First, since lead or lead-alloy is a soft material and coheres on the opposed material under the sliding condition with incidental fretting, the additive must therefore be free of lead or lead-alloy. Next, it was discovered that such additives as aromatic polyester, spherical carbon and zinc oxide whisker exhibited essentially no cohesion with the opposed material, and, further, the wear-resistance of PTFE was considerably enhanced by the combination of two or more of them. It was further confirmed that the bearing performance equivalent with that of conventional materials was also provided in the general sliding condition. Sliding bearing-material having improved resistance against fretting wear could thus be provided.

Therefore, the sliding bearing material according to the present invention is characterized by dispersing at least two kinds of aromatic polyester-resin particles, spherical carbon particles and zinc-oxide whisker in the matrix material consisting of PTFE.

The constitution of the invention is hereinafter described in more detail.

The aromatic polyester resin indicates paraoxybenzoyl-based polyester and is produced by means of solution polycondensating or fused polycondensating using paraoxy benzoic acid, terephthalic acid, iso-phthalic acid, 4,4-dihydroxyphenyl or their derivative(s). This resin includes homopolymer produced from the paraoxy benzoic acid, and a copolymer, in which the paraoxy benzoic acid, aromatic dicarboxylic acid and aromatic diol are copolymerized to improve formability. Among them, the homopolymer having the following structure (the product name "Ekonol" of Sumitomo Chemical Co., Ltd.) is preferably used.

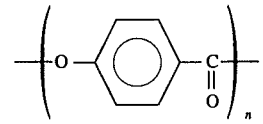

This aromatic polyester resin has preferably from 5 to 40 µm, particularly from 10 to 20 µm, of the center particle-diameter. When the center particle-diameter is less than 5 µm, the aromatic polyester resin wears out together with the PTFE and hence is not effective for enhancing the wear-resistance. On the other hand, when the center particle-diameter exceeds 40 µm, the coefficient of friction is increased so that deterioration of the wear-resistance occurs. Furthermore, preferably, the amount of aromatic polyester added is in the range of from 5 to 60% by weight, particularly from 10 to 20% by weight. If less than the lower amount is added, the effect of the addition is slight, while the addition of more than the upper amount deteriorates the wear-resistance. The above range is therefore preferred. The center particle-diameter herein corresponds to the peak frequency in the particle-distribution, with the proviso that the center particle diameter is the largest one when there are two or more peaks.

Next, spherical carbon is described.

Spherical carbon is obtained by heat treating granular thermosetting resin or pitch. The spherical carbon is mainly amorphous carbon and may comprise, in part, graphite with crystal arrangement or graphitized resin. Phenolformaldehyde resin, melamine resin, furane resin and the like can be used as the thermosetting resin.

Spherical carbon available at present includes Belpearl C-2000 (product of Kanebo Co., Ltd.), Univex GCP (product of Unitica Co., Ltd.), Mesocarbon Microbeads (product of Composite Research Institute of Osaka Gas Co., Ltd.), Glassbon-P (product of Owada Carbon Industries Co., Ltd.), and the like. The present inventors discovered that removal of this spherical carbon is slight during sliding, and, further, even if removal occurs, the removed carbon does not cohere to the opposing material. The center particle-diameter of the spherical carbon is preferably 20 µm or less, particularly from 1 to 15 µm. When the center particle-diameter exceeds 20 µm, the exposed area of the PTFE matrix is increased to the extent that, notwithstanding the fact that the amount of the spherical carbon added remains unchanged, the exposed PTFE wears out, thereby seriously decreasing the wear-resistance. The amount of spherical carbon added is from 5 to 60% by weight, particularly form 10 to 20% by weight. When this amount is less than 5% by weight, the wear-resistance is not improved. On the other hand, when this amount exceeds 60% by weight, the strength and lubricating property of the sliding material are lessened, so that the wear-resistance becomes poor. The amount of spherical carbon added is therefore preferably in the above mentioned range.

Zinc-oxide whisker has the same effects as those of spherical carbon. The zinc-oxide whisker is fiber having from 0.2 to 3.0 µm of diameter and from 2 to 50 µm of length. Its regular shape is in the form of a tetrapod. Preferably, the amount of zinc-oxide whisker added is from 3 to 30% by weight, particularly from 10 to 20% by weight. When the amount added is less than 5% by weight, the wear-resistance is not improved. On the other hand, when the amount added exceeds 30% by weight, strength and lubricating property of the sliding bearing material are lowered, with the result that the wear-resistance becomes poor. The amount of zinc-oxide whisker added is therefore preferably within the above mentioned range.

The above mentioned sliding bearing can be used preferably for parts, such as a throttle body-bush, auto-tensioner and the like, which are subjected to vibration in addition to sliding.

BEST MODE FOR CARRYING OUT THE INVENTION

Figure 3:
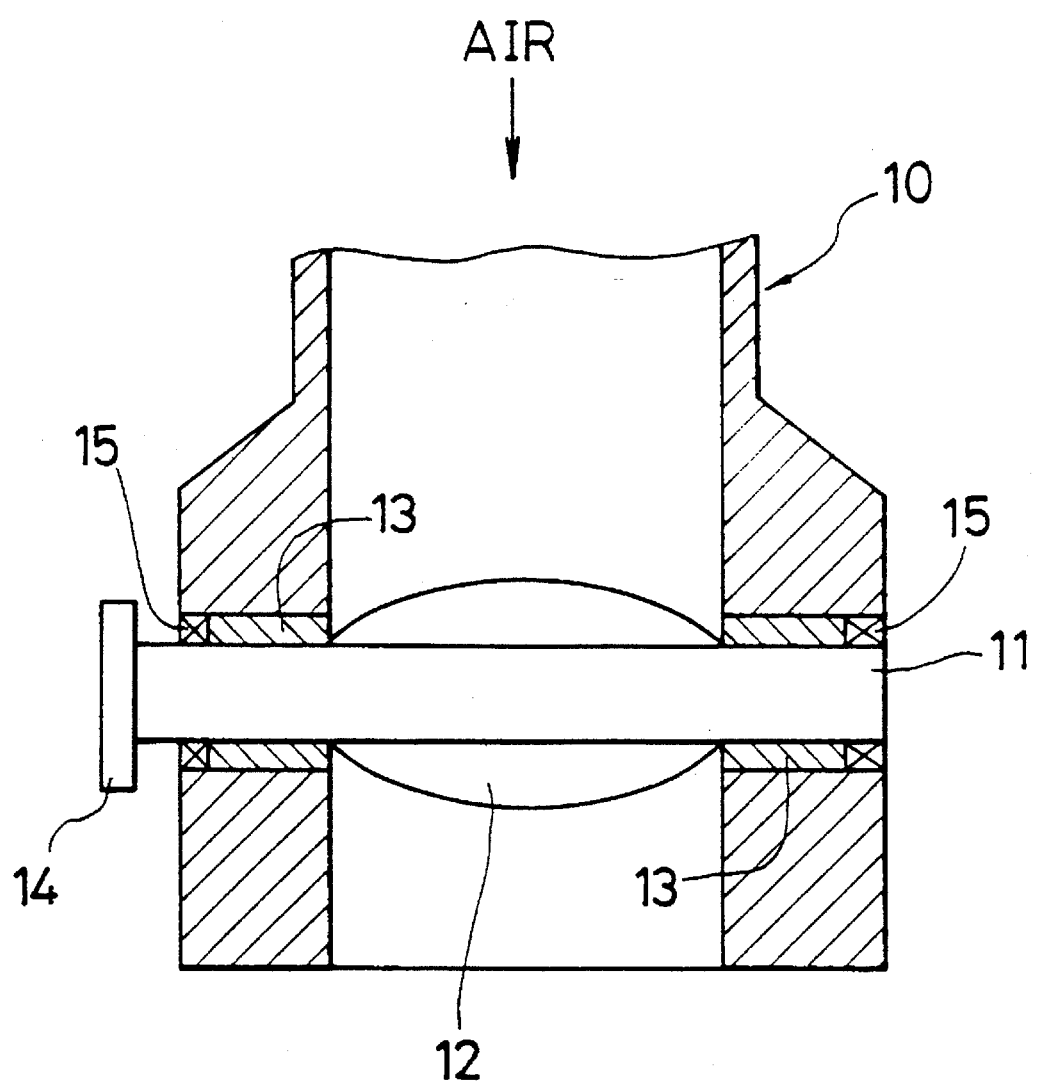
FIG. 3 is a drawing of a throttle-valve apparatus.

FIG. 3 shows a summarized structure of a throttle apparatus, which is a preferred applying apparatus. A shaft 11 is mounted in an aperture provided in the wall of a tube body 10 of the throttle apparatus in such a way that it can be rotated and is air-tight, and a throttle valve 12 is rigidly secured on the shaft 11. Air is sucked through an inlet of the tube body 10 and its flow rate is determined by a throttle valve 12 opened and closed by the lever 14 secured with an axle. The throttle valve 12 is opened or closed relative to the bush 13 and oil-seal 15 fixed to the throttle-body. A rocking movement is imparted to the shaft in accordance with the opening and closing mentioned above.

Since the throttle-body bush is subjected to the vibration of an engine and vibration due to travel, the throttle-body bush is exposed to a condition where the fretting wear is likely to occur. When the fretting wear advances, the clearance between the throttle body bush 13 and shaft 10 is increased. The shaft 10 is thus eccentrically displaced and the oil seal 15 wears out, excessively, thus lessening the sealing property. As a result, foreign matter, oil and the like, invade through the clearances between the throttle body bush 13 and the tube body, and, a great amount of solid matter deposits on the throttle-body bush, thereby impairing the reverting performance of the throttle valve 12. As a counter-measure against these, the sliding bearing material according to the present invention is considerably effective.

Figure 1:
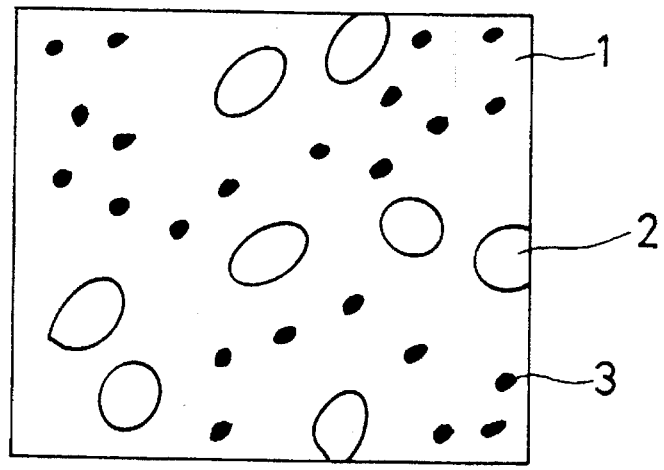
FIG. 1 is a schematic drawing of the microstructure of the sliding surface of the sliding bearing material according to the present invention, in which the spherical carbon is used as the additive material.
Figure 2:
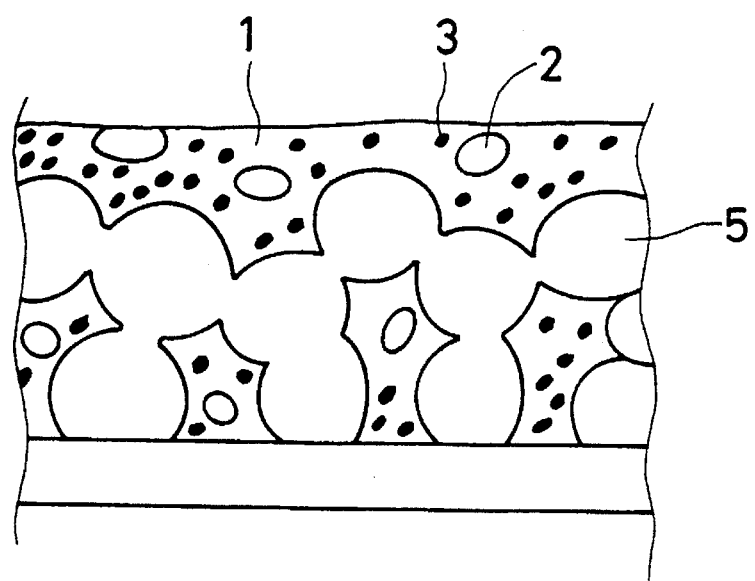
FIG. 2 is a schematic drawing of the microstructure of cross section of the sliding bearing material of FIG. 1.
Figure 4:
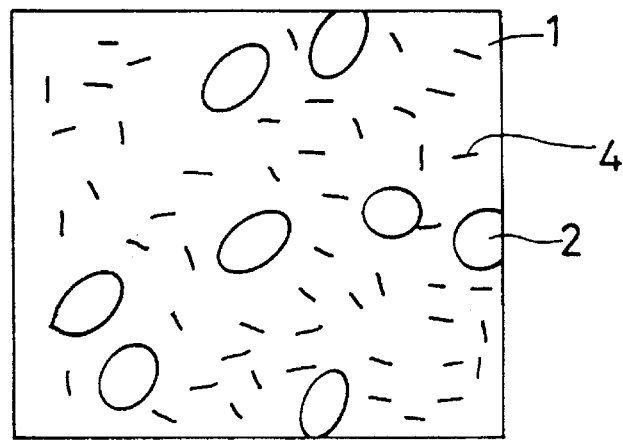
FIG. 4 is a schematic drawing of the microstructure of the sliding surface of the sliding bearing material according to the present invention, in which the aromatic polyester resin and zinc-oxide whisker are used as the additive material.
Figure 5:
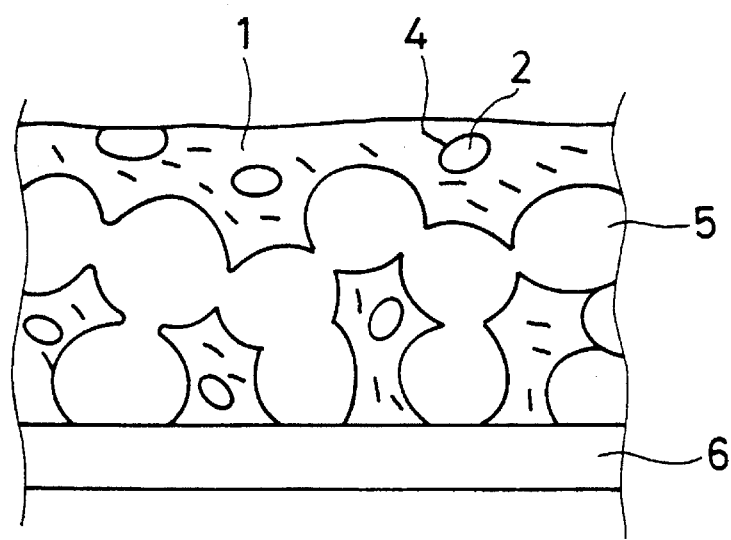
FIG. 5 is a schematic drawing of the microstructure of a cross section of the sliding bearing material of FIG. 4.

The microstructure of the sliding bearing material according to the present invention is schematically shown in FIGS. 1, 2, 4 and 5. Incidentally, FIGS. 1 and 4 are plane drawings of the sliding surface, and FIGS. 2 and 5 are cross sectional drawings. In addition, 1 is PTFE, 2 is aromatic polyester resin, 3 is spherical carbon, 4 is zinc-oxide whisker, 5 is lead-bronze powder or a sintered layer, and, 6 is backing metal.

The aromatic polyester does not exhibit cohesiveness to the opposed material. The aromatic polyester 2 is of large particle-diameter and hence polyester 2 subjected to and to with the result that the wear-resistance is improved.

The spherical carbon 3 has no cohesiveness to the opposed material and to itself and is present in the form of homogeneous particles. The spherical carbon therefore enhances the strength of the shaped resin article. In addition, it was found that the spherical carbon 3 enhances the wear-resistance under the sliding plus minute vibrating condition.

The zinc-oxide whisker 4 is in the form of a tetrapod and hence is strongly bonded with PTFE. The zinc-oxide whisker is hardly displaced while minute vibration is imparted thereto. It is possible to attain considerably enhanced wear-resistance as compared with that of conventional materials only by means of combining two or more of aromatic polyester 2, spherical carbon 3 and zinc-oxide whisker 4. The combination of aromatic polyester 2 and spherical carbon 3 is preferred among these additives.

In the sliding bearing material according to the present invention, PTFE 1 flows under a wearing plus vibrating condition and is moved and deposited on the sliding surface of the opposite material. Wear of PTFE hence occurs. The density of the additives 2, 3 is therefore increased at the sliding surface, while PTFE is deposited on the surface of the opposing material. Sliding between these surfaces therefore occurs. Stable sliding characteristics are obtained and the surface of the opposed material is not roughened by the bearing material according to the present invention.

The wear, which the sliding bearing material of the present invention effects, is that which ocurrs under a vibrating condition plus general sliding condition without vibration. The sliding bearing material according to the present invention can attain improved sliding characteristics also under the latter condition.

The present invention is hereinafter described by way of Examples.

As PTFE, AD-2 product of Asahi Fluoropolymers Inc., was used. Ekonol 101 (trade name), product of Sumitomo Chemical Industries Co., Ltd.) was used as the aromatic polyester. Belpearl C-2000 (trade name, particle diameter 1–15 μm, product of Kanebo Co., Ltd.) was used as the spherical carbon. Panatetra (trade name, fiber length 2–50 μm, product of Matsushita Electric Industries Co., Ltd.) was used as the zinc-oxide whisker.

EXAMPLE 1

Lead bronze powder was first spread on a degreased steel sheet, i.e., backing metal, and was sintered at 820°–850° C. A product with roughened surface was thus prepared. The above mentioned ingredients were mixed in the proportions shown in Tables 1 and 2 to provide the components of the sliding material. The roughened surface was impregnated with the ingredients, which were then dried at 100° C. and baked at 400° C. The samples in the form of bimetal were hence prepared.

The wear amount shown in Tables 1, 2 were measured under the following condition.

Tester: Basic tester of bush wear
Condition:
  Acceleration—50 G
  Frequency—200 Hz
  Temperature—room temperature
  Weight—270 g
  Clearance—50 μm

EXAMPLE 2

Various sliding materials were formed into a throttle-body bush and subjected to the vibration test by an actual machine under the following condition.

Figure 6:
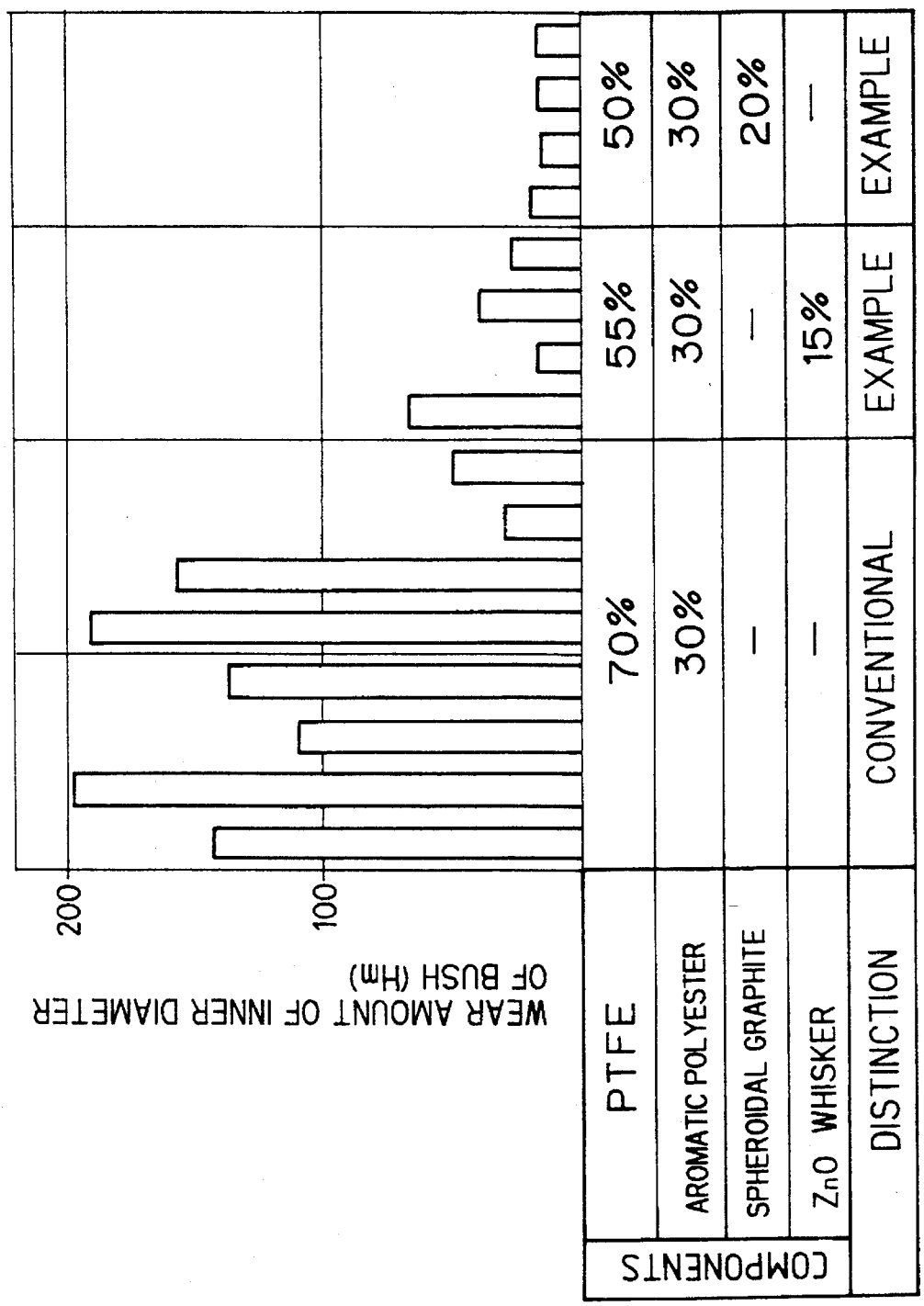
FIG. 6 is a graph showing the result of the wear test.

Acceleration: 50 G
Frequency: 200 Hz
Temperature: room temperature
Weight: 270 g
Clearance: 80 μm The composition and amount of wear of a throttle body bush are shown in FIG. 6. It can be seen from this drawing that the wear-amount of bush according to the inventive examples is considerably small.

EXAMPLE 3

Various sliding materials were formed into a throttle body bush and subjected to the vibration test by an actual machine under the following condition.

Figure 7:
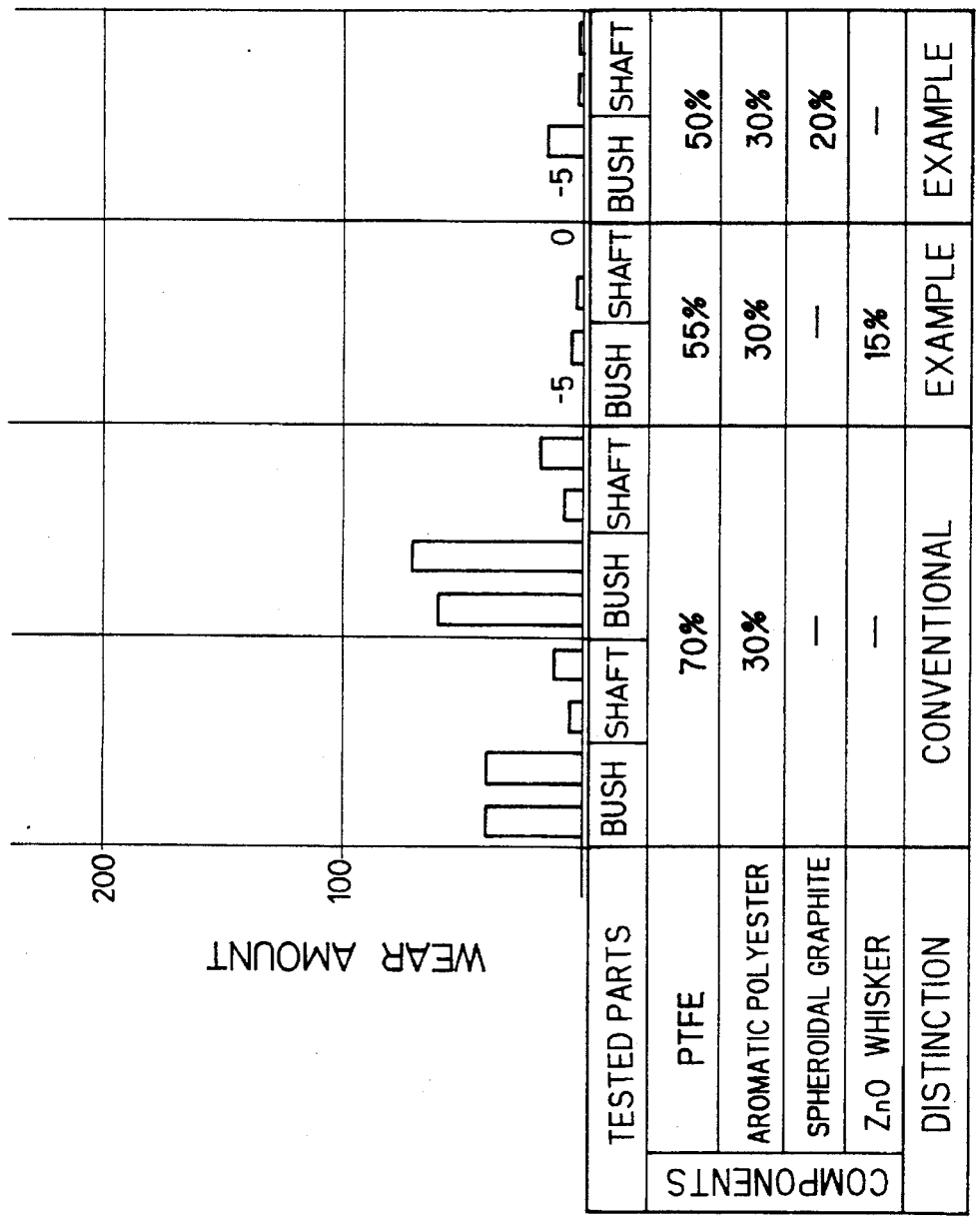
FIG. 7 is a graph showing the result of the wear test.

Acceleration: 50 G
Frequency: 200 Hz
Temperature: room temperature
Weight: 270 g
Clearance: 80 μm
Shaft: S45C The composition and amount of wear of a throttle body bush are shown in FIG. 7. It turns out from this drawing that

TABLE 1

| Symbol | Components (wt %) | | | | | Property Amount of Wear (μm) | Remarks |
| --- | --- | --- | --- | --- | --- | --- | --- |
|  | PFTE | Aromatic polyester | Spherical carbon | ZnO | Lead | | |
| 1 | Bal | 5 | 10 | — | — | 20 | Example |
| 2 | Bal | 10 | 10 | — | — | 15 | Example |
| 3 | Bal | 15 | 10 | — | — | 20 | Example |
| 4 | Bal | 25 | 10 | — | — | 10 | Example |
| 5 | Bal | 40 | 10 | — | — | 10 | Example |
| 6 | Bal | 15 | 3 | — | — | 40 | Example |
| 7 | Bal | 15 | 5 | — | — | 25 | Example |
| 8 | Bal | 15 | 15 | — | — | 10 | Example |
| 9 | Bal | 15 | 20 | — | — | 10 | Example |
| 10 | Bal | 15 | 30 | — | — | 15 | Example |
| 11 | Bal | 5 | — | 10 | — | 20 | Example |
| 12 | Bal | 10 | — | 10 | — | 20 | Example |
| 13 | Bal | 15 | — | 10 | — | 25 | Example |
| 14 | Bal | 25 | — | 10 | — | 20 | Example |
| 15 | Bal | 40 | — | 10 | — | 40 | Example |
| 16 | Bal | 15 | — | 3 | — | 30 | Example |
| 17 | Bal | 15 | — | 5 | — | 30 | Example |
| 18 | Bal | 15 | — | 15 | — | 25 | Example |
| 19 | Bal | 15 | — | 20 | — | 25 | Example |
| 20 | Bal | 15 | — | 30 | — | 20 | Example |
| 21 | Bal | 5 | 5 | 10 | — | 20 | Example |
| 22 | Bal | 5 | 10 | 5 | — | 20 | Example |
| 23 | Bal | 30 | 10 | 10 | — | 30 | Example |
| 24 | Bal | 30 | 5 | 5 | — | 50 | Example |
| 25 | Bal | 30 | — | — | 35 | 120 | Comparative |
| 26 | Bal | 30 | — | — | — | 80 | Comparative |

No. 25 of Table 1 is a conventional material containing lead and the figures of No. 25 make it clear that lead accelerates the fretting wear. No. 26 of Table 1 is a comparative material with the addition of only aromatic polyester. It turns out that the fretting wear of the comparative material is greater than that of the inventive material.

the wear-amount of bush according to the inventive examples is very small, and, further, the wear amount of the shaft is very small. It is therefore very clear that not only the inventive material exhibits improved wear-resistance but also the wear of the opposed material is lessened.

EXAMPLE 4

Aromatic polyester (Ekonol E101, product of Sumitomo Chemical Industries Co., Ltd.) in 30% by weight, spherical graphite (Belpearl C-2000, product of Kanebo Co., Ltd.) in 10% by weight and PTFE (Polyflon M12, product of Daikin Co., Ltd.) in balance were mixed and compression shaped into a cylindrical form. Baking was then carried out at 380° C. Machining was then carried out to provide a shape and dimension of a throttle body bush to prepare a test sample. The thus provided bush was tested under the same conditions as in Examples 2 and 3. Improved wear-resistance was confirmed.

Industrial Applicability

As is described hereinabove, the PTFE-based material according to the present invention exhibits little wear under condition in which vibration is imparted. The PTFE-based material according to the present invention therefore enhances reliability of the sliding parts of various machines and equipment and can prevent enlargement of clearance during operation.

We claim:

1. Sliding bearing material comprising aromatic polyester-resin particles, or at least one of spherical-carbon particles and zinc-oxide whisker, dispersed in a matrix consisting of polytetraflouoroethylene.

2. Sliding bearing material according to claim 1, wherein the center particle-diameter of the aromatic polyester-resin particles is from 5 to 40 μm.

3. Sliding bearing material according to claim 1, wherein the amount of the aromatic polyester resin particles is from 5 to 60% by weight.

4. Sliding bearing material according to any one of claims 1 through 3, wherein the spherical carbon is that obtained by heat treating thermosetting resin or pitch.

5. Sliding bearing material according to claim 4, wherein the center particle-diameter of the spherical carbon is 20 μm or less.

6. Sliding bearing material according to claim 4, wherein the amount of the spherical carbon is from 3 to 30% by weight.

7. Sliding bearing material according to any of claims 1 through 3, wherein the amount of the zinc-oxide whisker is from 3 to 30% by weight.

* * * * *